United States Patent [19]

Griffin

[11] Patent Number: 4,553,842

[45] Date of Patent: Nov. 19, 1985

[54] TWO DIMENSIONAL OPTICAL POSITION INDICATING APPARATUS

[75] Inventor: James L. Griffin, Carpentersville, Ill.

[73] Assignee: Illinois Tool Works Inc., Chicago, Ill.

[21] Appl. No.: 492,859

[22] Filed: May 9, 1983

[51] Int. Cl.$^4$ ...................... G01B 11/00; G01B 11/03
[52] U.S. Cl. .................................. 356/375; 33/1 M; 178/18
[58] Field of Search ...................... 356/373, 375, 372; 33/1 DD, 1 CC, 1 M; 178/18; 250/221

[56] References Cited

U.S. PATENT DOCUMENTS 4,107,522  8/1978  Walter ................................. 250/221
4,420,261 12/1983  Barlow et al. ...................... 356/375

Primary Examiner—R. A. Rosenberger
Assistant Examiner—Michael Vollero
Attorney, Agent, or Firm—Donald D. Mondul; Thomas W. Buckman

[57] ABSTRACT

An optical position indicating apparatus having a light source, a detector for detecting the presence of light and producing an electrical output in response thereto, a reflecting structure for reflecting light from the light source across a target zone, and, a retroreflecting structure for reflecting the light incident thereupon along a path substantially coincident with the path of incidence of the light. The retroreflecting structure comprises a plurality of retroreflective assemblies, the reflecting structure and the plurality of retroreflective assemblies are substantially disposed about the target zone and a limiting structure limits the detector to a finite viewing range so that rotation of the detector effects scanning of the target zone. The detector is capable of measuring angular displacement from a reference so that presence of an opaque object within the target zone will register upon the detector as a plurality of shadows thereby resulting in absence of electrical output from the detector for each of the plurality of shadows, whereby the location of the opaque object within the target zone can be determined in two dimensions by geometric calculations involving angular displacements of the plurality of shadows.

14 Claims, 7 Drawing Figures

TWO DIMENSIONAL OPTICAL POSITION INDICATING APPARATUS

BACKGROUND OF THE INVENTION

The present invention is directed to an apparatus for determining the location of an object along one or more axes and in particular to an apparatus for accomplishing such location by optical means.

In today's world the increasing prevalence of computers and devices using computer-like apparatus has given rise to a recognition of a need for simplifying the human operator-to-computer interface to facilitate the input of data to the computing apparatus. Numerous devices and apparatus have been produced for such interface enhancement such as keyboards, joystick controls, and various types of touch screen inputs. The various types of touch screen inputs include screen overlays superimposed upon cathode ray tube displays of computing devices, which apparatus can be capacitive, resistive, ultra-sonic or consist of a conductive grid. There are various disadvantages to such touch screens: the overlay in front of the cathode ray tube degrades the contrast of the display as it appears to an operator and may also degrade the resolution of the display on the cathode ray tube, such overlays attract and trap dirt to further contribute to degradation of contrast and resolution, such overlays are often made of materials which are easily scratched or otherwise optically degraded with time or use, and with such overlays non-glare cathode ray tube finishes are greatly reduced in effectiveness. Moreover, such overlays touch screens generally increase in complexity and expense of manufacture with increases of resolution in their detection capabilities.

Optical touch screen input apparatus overcome the aforementioned shortcomings of touch screen overlays by creating a light curtain in front of a cathode ray tube or other display, penetration of which curtain is detectable by the apparatus and interpreted to fix the location of the penetration in the requisite number of dimensions for the particular application. Examples of types of optical touch screen input devices include the system disclosed in U.S. Pat. No. 4,267,443 (Carroll) and the device disclosed in U.S. Patent Application Ser. No. 183,357, filed Sept. 2, 1980 (Barlow). The Carroll system employs arrays of light emitting diodes and photo-detectors along opposite sides, switching of the light emitting diodes in a sequential manner and sensing the presence of light sequentially in the opposing photo-detectors. With appropriately situated arrays of light emitting diodes and corresponding opposing photo-detectors it is possible by such a device to determine the location of an object within a two dimensional location field. The Carroll apparatus, however, is disadvantageous because the large numbers of light emitting diodes and photo-detectors required by that apparatus render it expensive to construct. Further, the large number of discreet elements renders the device more prone to material breakdown than a device with a lesser number of components. Still further, resolution of the Carroll apparatus is limited by the number and size of the light emitting diodes and photo-detectors, and any increase in resolution of detection by such a device is necessarily accompanied by a commensurate increase in the number of components, thereby increasing the cost of construction and the probability of breakdown.

The Barlow device employs a single continuous light source in a corner of a touch field and a photo-detector scanning the touch field, which photo-detector is located in the opposite corner from the light source. Along all four sides of the touch field there are stepped mirrors arranged so that light from the light source is reflected across the touch field in two perpendicular arrays and subsequently directed toward the rotating detector. Thus the light from each beam arrives at the detector from a slightly different angle and, because the detector is rotatively scanning the touch field, the pattern of light of the detector is interpretable to determine the location of an object within the touch field in two dimensions. Such a device as is disclosed by Barlow overcomes some of the disadvantages of Carroll in that it is potentially lower in cost of production and maintenance, however, a high degree of precision is required in building a workable Barlow system since the mirrors must be precisely aligned for proper operation to occur. Such a requirement for a high degree of precision in alignment necessarily adds to cost of production and sensitivity to physical shock, both of which are disadvantageous in a commercial environment.

SUMMARY OF THE INVENTION

The present invention is a device for locating an object in two dimensions within a target zone by detection of interruption of light paths dispersed across the target zone. The present invention, therefore, provides a direct human operator-to-computer interface which requires little or no familiarity with any intervening system such as a keyboard or the like. Of course, a plurality of devices incorporating the present invention could be arranged adjacent to each other to provide three dimensional location of an object within a target space. The present invention incorporates extremely low cost materials which facilitate simple, low cost construction which does not require critical tolerances and is therefore easy to manufacture. Further, the materials incorporated in the present invention facilitate construction of the invention with narrow borders and provide, theoretically, infinite resolution with no additional cost or complexity.

This flexibility, ease and low cost of construction is accomplished in large part through the employment of material which is configured so that a high percentage of light received within given angular displacement limits from a perpendicular to the surface of the material at the point of incidence will be reflected back along the path of incidence. Thus, the term retroreflecton is applied to such material. Light incident at angles outside the angular limits will be retroflected as well but to a sharply lesser degree as those angular limits are exceeded. Moreover, such retroreflective material is disposed within the present invention in a manner whereby light which is incident upon that material at any given point is within the angular displacement limits from a perpendicular to ensure a high degree of retroreflection.

It is therefore an object of this invention to provide an optical position locating apparatus of simple low cost, easily maintained rugged construction.

A further object of the invention is to provide an optical position locating apparatus which is easy to manufacture with narrow borders disposed about the target zone.

Still a further object of this invention is to provide an optical position locating apparatus of theoretically infinite resolution without high cost or critical tolerance requirements.

Further objects and features of the present invention will be apparent from the following specification and claims when considered in connection with the accompanying drawings illustrating the preferred embodiment of the invention.

DETAILED DESCRIPTION OF THE DRAWINGS

Figure 4:
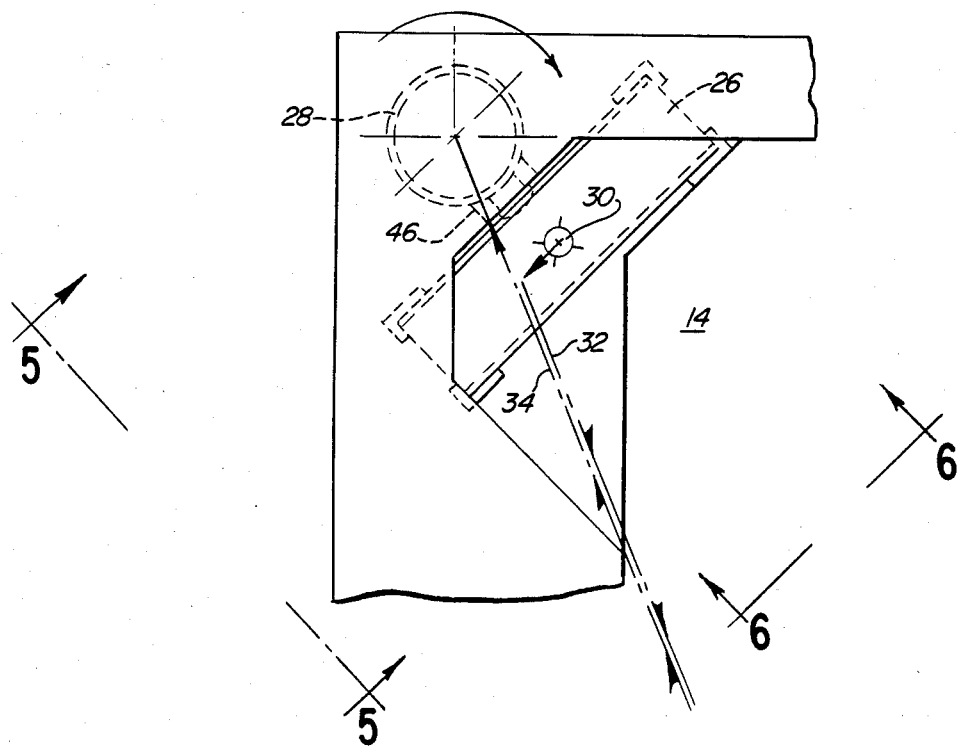
FIG. 4 is a plan view of a portion of the present invention containing the light source, light distribution means, and detector means.
Figure 5:
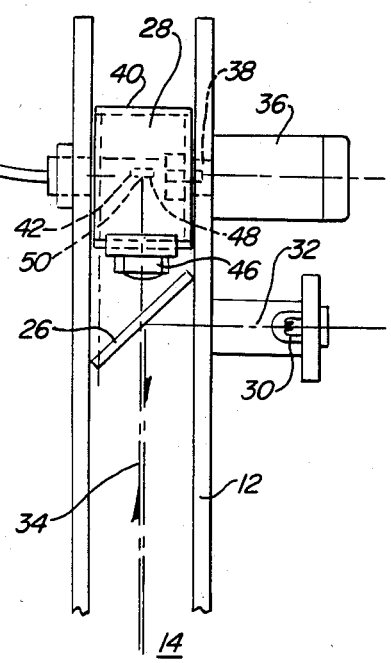
Figure 6:
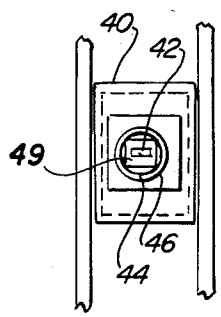
Figure 7:
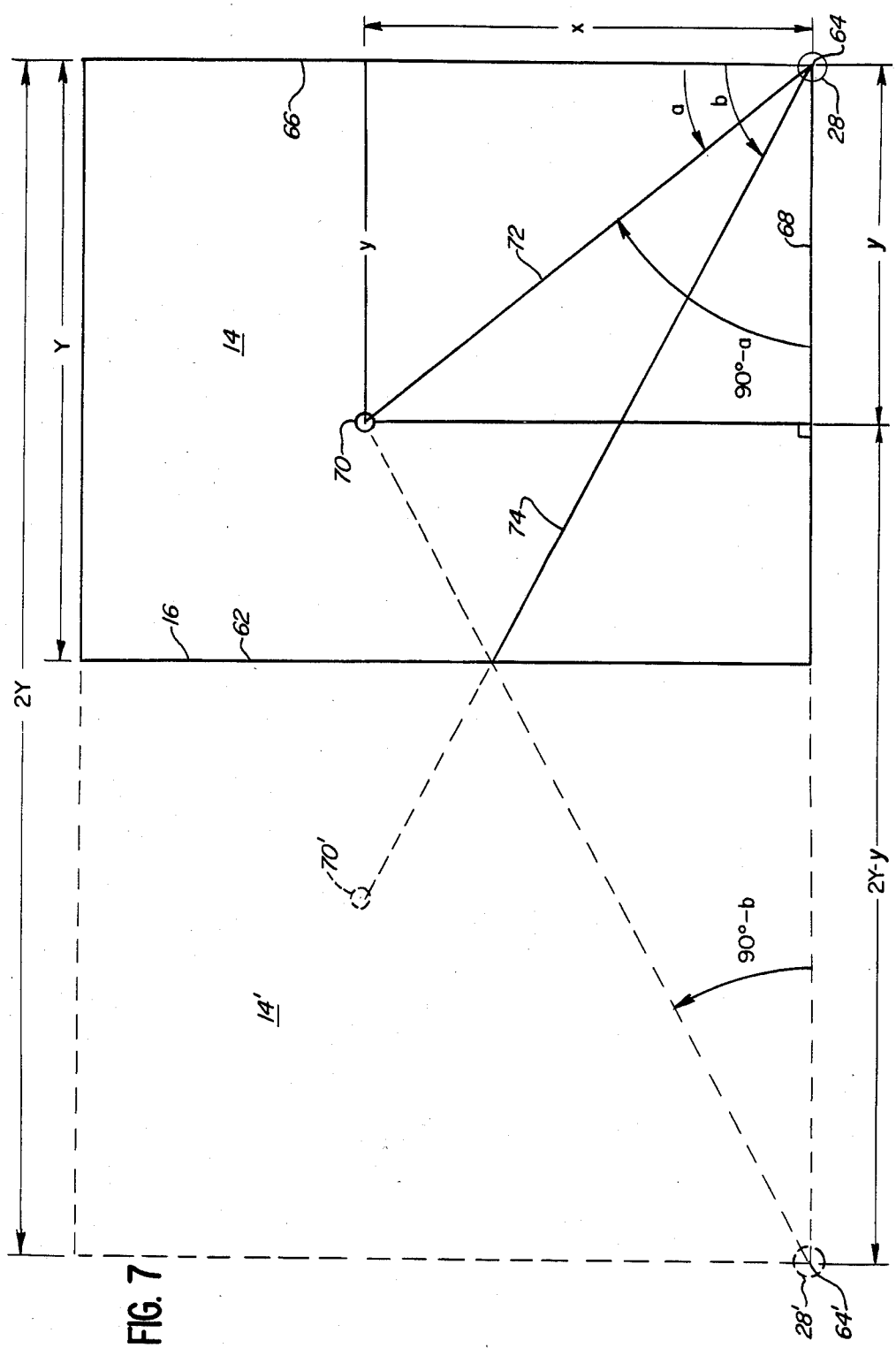

FIG. 5 is a view of FIG. 4 taken along section 5—5.
FIG. 6 is a view of FIG. 4 taken along section 6—6.
FIG. 7 is a schematic diagram illustrating the geometric calculations to determine the location of an object within the target zone of the present invention.

DETAILED DESCRIPTION OF THE INVENTION

Figure 1:
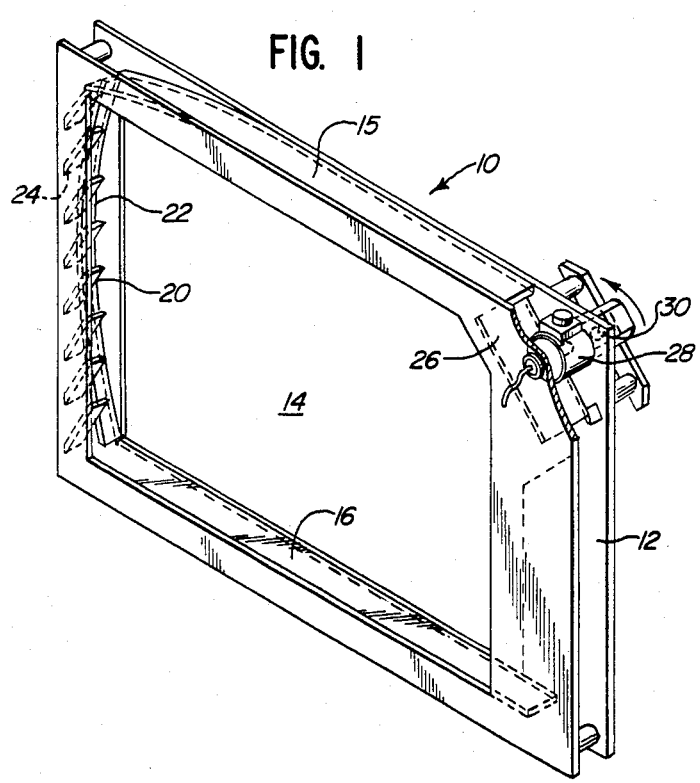
FIG. 1 is an isometric view of the preferred embodiment of the present invention.

The preferred embodiment of an optical location apparatus 10 is shown in perspective at FIG. 1. An optical position location apparatus 10 is comprised of a housing 12 which serves to maintain the various elements of the apparatus 10 in proper relative relation as well as to protect those elements from environmental incursions in an operating situation. The housing 12 further serves to define a target zone 14 within which target zone 14 the location of objects is to be determined. Disposed within the housing 12 about the target zone 14 are a flat reflector, such as a mirror 16, a retroreflector 18 and a retroreflector assembly 20. The retroreflector assembly 20 is comprised of a retroreflector strip 22 and a plurality of retroreflector elements 24 arranged in echelon adjacent to the retroreflector strip 22. In one corner of the optical position location apparatus 10 there is light directing means, such as a beam splitter 26, a detector assembly 28 and a light source 30.

Referring now to FIGS. 4, 5 and 6, the detector assembly 28, light source 30 and the beam splitter 26 will be discussed in greater detail. For ease of understanding of the invention, like reference numerals will be used to identify like elements in the various drawings.

In FIG. 4 the detector assembly 28 is shown situated in spaced relation from the target zone 14 with the beam splitter 26 interposed between the detector assembly 28 and the target zone 14. The light source 30 is positioned below the beam splitter 26 in a manner allowing transmitted light beams such as 32 to be distributed by the beam splitter 26 across the target zone 14. Returning light beams such as 34, having traversed the target zone 14 in a manner to be described in more detail hereafter, are transmitted through the beam spliter 26 to the detector assembly 28.

FIG. 5 shows the light source 30 situated adjacent the beam splitter 26 and the detector assembly 28 situated behind the beam splitter 26. The beam splitter 26 is situated at a 45 degree angle to the housing 12 so that transmitted light beams such as 32 travel from the light source 30, reflect from the beam splitter 26 to traverse the target zone 14 and return as returning light beams such as 34 to be transmitted through the beam splitter 26 to the detector assembly 28. The detector assembly 28 is comprised of a drive motor 36 which has a shaft 38 and a detector housing 40, which detector housing 40 is supported on the shaft 38 so that the detector housing 40 rotates in response to rotation of the drive motor 36. Fixedly contained within the detector housing 40 is a photo-detector 42, and formed in the wall of detector housing 40 is an aperture 44 (best seen in FIG. 6). Aligned with the aperture 44 and the photo-detector 42 and affixed to the detector housing 40 is a lens 46. The sensitive face 48 of the photo-detector 42 is a plane which contains the focal point 50 of the lens 46. A mask 49 is affixed to the sensitive face 48, which mask 49 provides a view-limiting aperture (not shown) centered about the focal point 50 of the lens 46 to enhance resolution of detection of light interruptions by objects with the target zone 14. Thus, by rotating the detector housing 40 and its associated aperture 44 and lens 46, the photo-detector 42 scans the target zone 14 for the presence of returning light, such as beams 34, and produces an electrical signal in response to the presence of such light, which signal is provided to and processed by external electronic circuitry (not shown).

Figure 2:
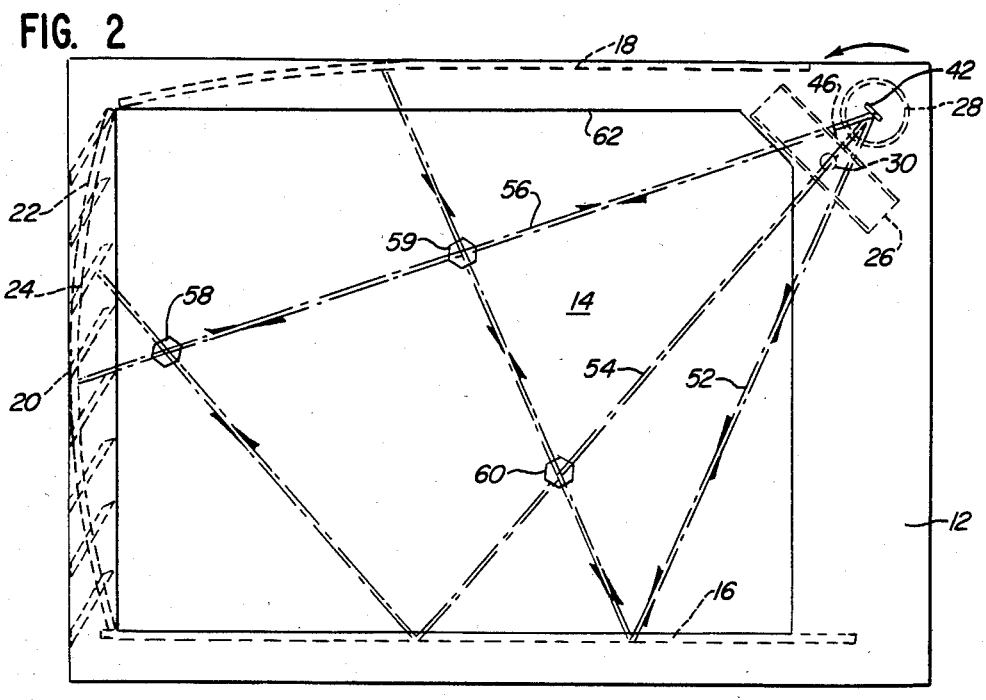
FIG. 2 is a front plan view of the preferred embodiment of the invention illustrating representative light paths associated with the invention and interaction of those light paths with representative objects in the target zone.

Referring now to FIG. 2, the operation of the present invention will be explained in greater detail. There are generally three groups of light paths employed by the present invention: a first group, such as 52, emanates from the light source 30, is reflected by the beam splitter 26 across the target zone 14, and is reflected from the mirror 16 to the retroreflector 18. The retroreflector 18 is fashioned from a material having the characteristic that for light received by that retroreflector 18 within given angular displacement limits from a perpendicular to the surface of the retroreflector 18 at the point of incidence, a large percentage of that light will be reflected back along the path of incidence, thus the term retroreflection is applied to such material. Some light is retroreflected at angles of incidence outside the established angular limits from a perpendicular, but retroreflected light as a percentage of incident light, falls off rapidly as angles of incidence exceed those angular limits. The retroreflector 18 is curved as shown in FIG. 2 appropriately to ensure that light incident upon retroreflector 18 which is reflected from the mirror 16 will, along the length of retroreflector 18, have an angle of incidence within the prescribed angular limits for the material comprising retroreflector 18 appropriate to ensure a high degree of retroreflection. A second group of light paths, such as 54, emanates from the light source 30, is reflected by the beam splitter 26 across the target zone 14, is reflected by the mirror 16 to arrive at the retroreflector assembly 20. The retroreflector elements 24 of the retroreflector assembly 20 are arranged in echelon to ensure angles of incidence of light paths such as 54 which arrive at the retroreflector elements 24 via reflection from the mirror 16 at an angle of incidence within the limits required for retroreflection of the light back along the path of incidence, thence to be reflected from the mirror 16 and return to the photo-detector 42 via transmission through the beam splitter 26 and the lens 46. Of course, some portion of light paths 54 reflected from mirror 16 will be incident upon retroreflector strip 22; however, angles of incidence of light paths 54 upon retroreflector strip 22 will be outside the angular limits for a high degree of retroreflectivity. The retroreflector elements 24 are situated to ensure a high degree of retroreflectivity of light paths 54 so that any retroreflected light paths 54 from retroreflector strip 22 will have negligable impact upon operation of the invention. A third group of light paths, such as 56, emanates from the light source 30, is reflected by the beam splitter 26 across the target zone 14 directly to retroreflector strip 22 of the retroreflector assembly 20. Retroreflector strip 22 is curved to ensure angles of incidence of light paths such as 56 are within the limits required for a high degree of retroreflection back along the path of incidence to the photo-detector 42 via transmission through the beam splitter 26 and lens 46. The presence of an object such as 58, 59 or 60 within the target zone 14 would interupt such light paths as 52, 54 or 56; such interuptions would be detected as an absence of light by the photo-detector 42 and, through geometrical calculations to be discussed in greater detail hereafter, the position of the object causing such an absence of light can be determined with precision.

Figure 3:
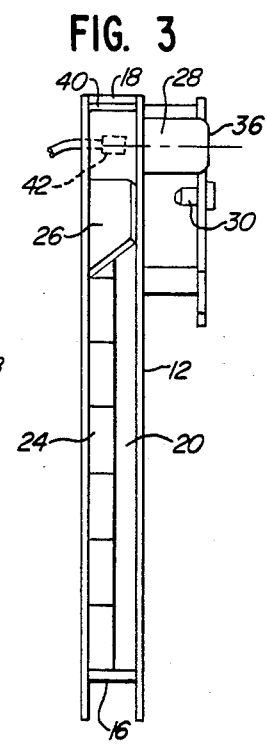
FIG. 3 is a side view of the preferred embodiment of the present invention.

FIG. 3 illustrates the relative positions of the various elements of the invention and provides clarity as to the construction of the device. It is worthy of note that the inner boundary 62 of the housing 12 is open to the target zone 14 to facilitate free passage of light across the target zone 14 to the various reflective and retroreflective elements bordering thereon. Of course, colored filters could be interposed at the inner boundary 62 of the housing 12 to limit responsiveness of the device to specific ranges of the light spectrum as may be appropriate in a given operational environment.

Referring now to FIG. 7, a schematic diagram of the preferred embodiment of the present invention is illustrated with the inner boundary 62 bordering the target zone 14 and the detector assembly 28 located with the sensitive face 48 (not shown) of the photo-detector 42 situated at an origin 64 of a coordinate axis, the x axis of which is comprised of side 66 of the inner boundary 62 and the y axis of which is comprised of side 68 of the inner boundary 62.

In the schematic diagram of the preferred embodiment of the present invention illustrated in FIG. 7, the mirror 16 is located opposite the origin 64, and beyond the mirror 16 is depicted, in broken lines, the virtual image of the target zone 14, 14'. Thus an object 70 located within the target zone 14 will have a virtual image object 70' located within the virtual image target zone 14'. Similarly there will be a virtual image origin 64' and a virtual image detector assembly 28'. The blocking of returning light beams (not shown) within the target zone 14 will produce two shadows at the origin 64. A first shadow 72 is associated with the object 70 and the target zone 14 and is angularly displaced from the x axis 66 by an angle a. A second shadow 74 is associated with the virtual image 70' of the virtual image target zone 14', which second shadow 74 is angularly displaced from the x axis 66 by an angle b. As can be seen by FIG. 7, the x displacement of the object 70 from the origin 64 may be expressed by the equation:

$$x = y \tan(90° - a) = y \, CTN \, a,$$

where y is the displacement of the object from the x axis.

It should also be noted that x may be expressed as:

$$x = (2y - y) \tan(90° - b) = (2y - y) \, ctn \, b.$$

Simultaneous solution of the above equations yields the result:

$$x = 2y/(\tan a + \tan b)$$

The y displacement of the object 70 within the target zone 14 may be directly calculated as follows:

$$y = x \tan a$$

Thus the x and y coordinates of the object 70 within the target zone 14 with respect to the origin 64 can be precisely geometrically calculated as the detector 28 rotates about the origin 64 and detects shadows caused by the object 70 and its virtual image 70'. External electronic circuitry known in the art (not shown) is employed to accomplish this geometric calculation with sufficient speed and accuracy to accomplish any desired resolution of x, y location of an object within the target zone 14.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims.

I claim:

1. An optical position indicating apparatus comprising a light source, detector means for detecting presence of light and producing an electrical output in response thereto; reflecting means for reflecting light from said light source across a target zone; and retroreflecting means for reflecting said light incident thereupon along a path substantially coincident with the path of incidence of said light; said retroreflecting means comprising a plurality of retroreflective assemblies, said reflecting means and said plurality of retroreflective assemblies being substantially disposed about said target zone in an arrangement whereby light emitted from said light source reflects from at least one of said reflecting means and said plurality of retroreflective assemblies and converges at said detector means; limiting means for limiting said detector means to a finite viewing range; said detector means being rotatable to effect scanning of said target zone said detector means being capable of measuring angular displacement from a reference whereby the presence of an opaque object within said target zone will register upon said detector means as a plurality of shadows as said detector means scans said target zone thereby resulting in absence of said electrical output for each of said plurality of shadows; whereby the location of said opaque object within said target zone can be determined in two dimensions by geometric calculations involving angular displacements of said plurality of shadows.

2. An optical position indicating apparatus as recited in claim 1 wherein said plurality of retroreflective assemblies comprises a first assembly comprising a first strip of retroreflective material; a second assembly comprising a second strip of retroreflective material, and a third assembly comprising a plurality of strips of retroreflective material in echelon.

3. An optical position indicating apparatus as recited in claim 2 wherein said target zone is substantially rectangular, said light source and said detector means being positioned in a first corner of said target zone; said reflecting means defining a first side of said target zone adjacent a second corner of said target zone; said second corner being opposite said first corner; said first assembly defining a second side of said target zone opposite said first side, and said second assembly defining a third side of said target zone adjacent said second corner of said target zone.

4. An optical position indicating apparatus as recited in claim 3 wherein said reflecting means, said first assembly and said second assembly each has a first end, a second end, a lower edge and an upper edge, said edges being longer than said ends and all of said lower edges being substantially coplanar; and said third assembly is positioned adjacent said upper edge of said second assembly.

5. An optical position indicating apparatus as recited in claim 3 wherein said reflecting means and said first assembly each has a first end, a second end, a lower edge and an upper edge, said edges being longer than said ends and all of said lower edges being substantially coplanar in a target plane; said third assembly having a plurality of first edges and a plurality of second edges, said plurality of first edges being substantially in said target plane, and said second assembly being positioned adjacent said plurality of second edges.

6. An optical position indicating apparatus as recited in claim 4 or 5 wherein said first assembly is curved appropriately to receive light reflected from said reflecting means at substantially a perpendicular along the length of said second side.

7. An optical position indicating apparatus as recited in claim 6 wherein said second assembly is curved appropriately to receive light from said light source at substantially a perpendicular along the length of said third side.

8. An optical position indicating apparatus as recited in claim 7 wherein said third assembly is positioned to present a plurality of retroreflecting sides to receive light reflected from said reflecting means at substantially a perpendicular along the length of said third side.

9. An optical position indicating apparatus as recited in claim 8 wherein said apparatus further comprises light directing means for directing emitted light from said light source across said target zone and for directing reflected light received from said target zone to said detector means.

10. An optical position indicating apparatus as recited in claim 9 wherein said light directing means is a beam splitter.

11. An optical position indicating apparatus comprising a light source; detector means for detecting presence of light and producing an electrical output in response thereto; a plurality of reflective means for distributing light emitted from said light source across a target zone, said target zone being at least partially bordered by said reflective means; and a light directing means for directing light from said light source across said target zone and for directing return light received from said target zone to said detector means; said target zone being substantially rectangular; and said light source, said detector means and said light directing means being positioned at a first corner of said target zone and said plurality of reflecting means comprising a first reflector assembly adjacent a second corner of said target zone, said second corner being positioned opposite said first corner; a second reflector assembly defining a second side of said target zone adjacent said second corner, and a third reflector assembly defining a third side of said target zone opposite said first reflector assembly; said second reflector assembly and said third reflector assembly being comprised of retroreflective material.

12. An optical position indicating apparatus as recited in claim 11, wherein said second reflector assembly comprises at least two subassemblies; at least a first of said at least two subassemblies comprising a substantially continuous strip of retroreflective material appropriately curved to receive light along the length of said second side from said light directing means at substantially a perpendicular, and at least a second of said at least two subassemblies comprising a plurality of retroreflective strips in echelon and positioned to receive light along the length of said second side reflected from said first reflector assembly at substantially a perpendicular.

13. An optical position indicating apparatus as recited in claim 12 wherein said third reflector assembly is appropriately curved to receive light along the length of said third side reflected from said first reflector assembly at substantially a perpendicular.

14. An optical position indicating apparatus as recited in claim 13 wherein said detector means is rotatable and configured to effect scanning of said target zone; said detector means including means for measuring angular displacement from a reference; whereby an opaque object located within said target zone will produce a plurality of shadows as said detector means scans said target zone, thereby resulting in absence of said electrical output for each of said plurality of shadows.

* * * * *